United States Patent [19]

Durand, Jr. et al.

[11] 4,264,907
[45] Apr. 28, 1981

[54] ROLLING DUAL MODE MISSILE

[75] Inventors: Charles C. Durand, Jr., Upland; Ralph E. Hawes, Jr., Claremont, both of Calif.

[73] Assignee: General Dynamics Corporation, Pomona Division, Pomona, Calif.

[21] Appl. No.: 722,104

[22] Filed: Apr. 17, 1968

[51] Int. Cl.³ .................... F41G 7/00; G01S 13/86
[52] U.S. Cl. .................... 343/6 ND; 244/3.15; 244/3.16; 244/3.19
[58] Field of Search .......... 343/6, 6 IR, 6 ND; 244/3.15, 3.16, 3.19

[56] References Cited

U.S. PATENT DOCUMENTS

| | | | |
|---|---|---|---|
| 2,842,760 | 7/1958 | McLucas | 343/6 IR |
| 3,108,270 | 10/1963 | Fairbanks | 343/6 IR |
| 3,165,749 | 1/1965 | Cushner | 343/6 IR X |
| 3,242,485 | 3/1966 | Astheimer | 343/6 IR |
| 3,312,970 | 4/1967 | Bond | 343/6 |
| 3,351,303 | 11/1967 | Depew, Jr. et al. | 244/3.16 |

*Primary Examiner*—Malcolm F. Hubler
*Attorney, Agent, or Firm*—Albert J. Miller; Edward B. Johnson

[57] ABSTRACT

In a rolling missile a seeker system which is responsive to two forms of energy emanating from a target. The system has the capability to switch between guidance modes during its path towards its intended target.

10 Claims, 9 Drawing Figures

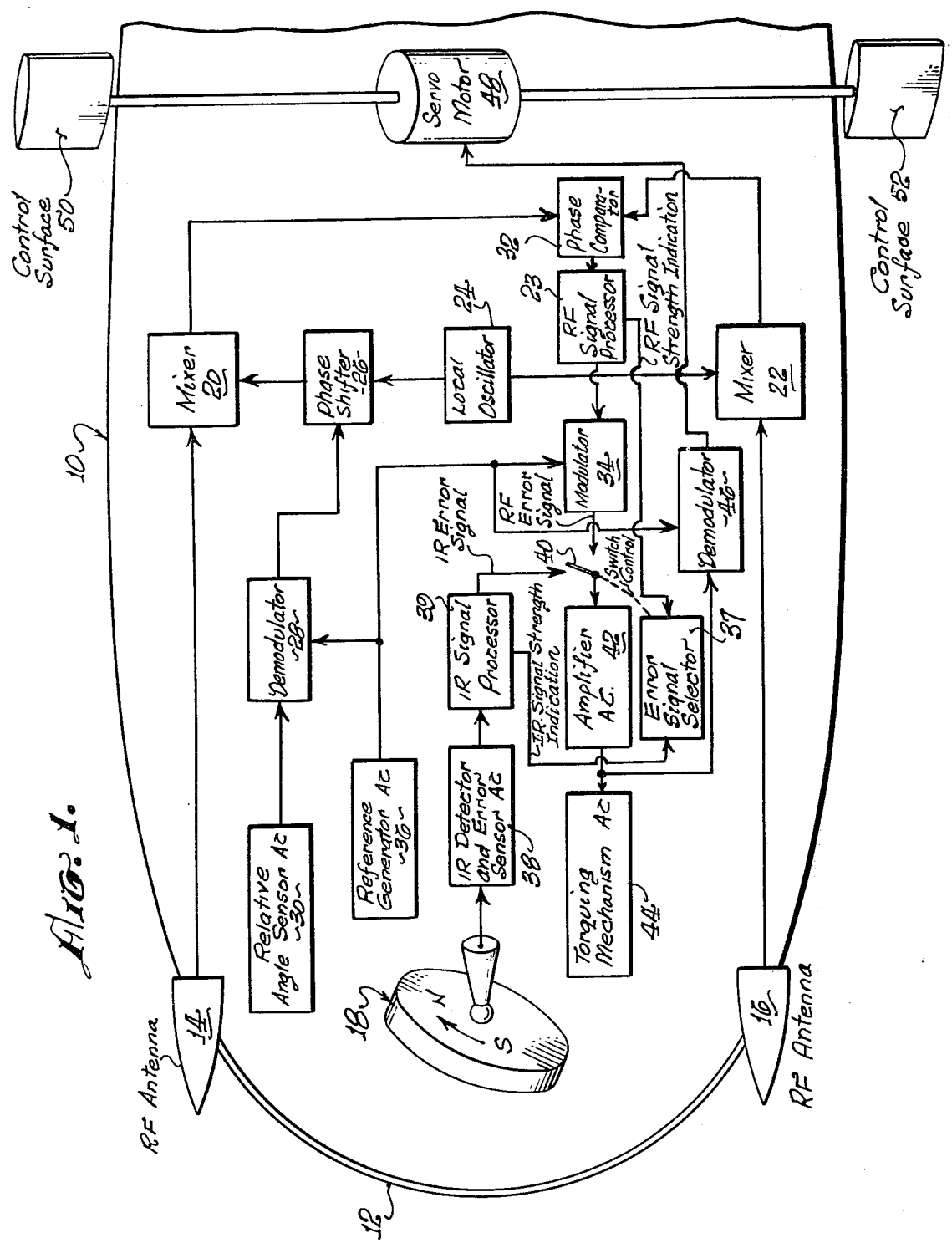

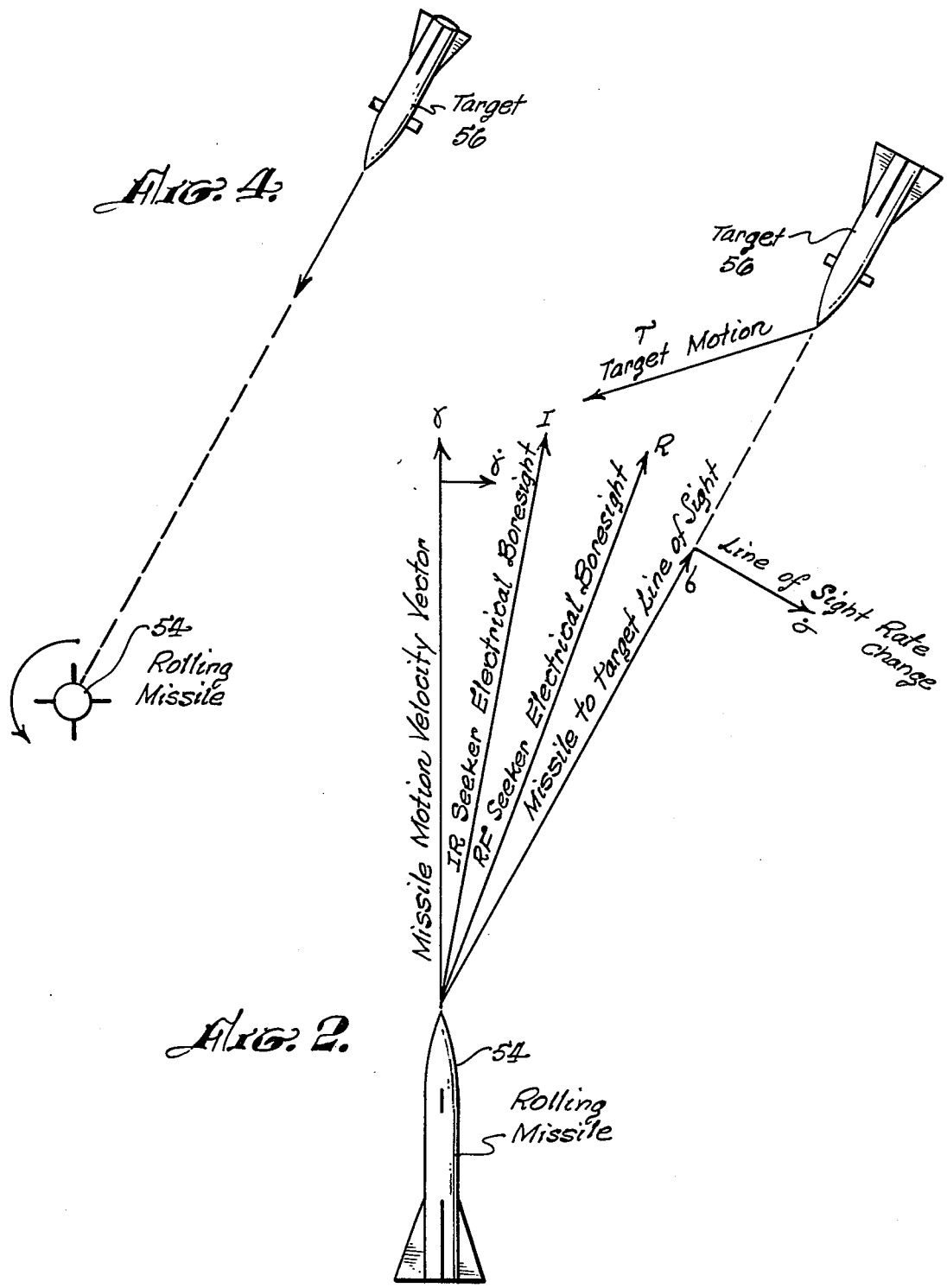

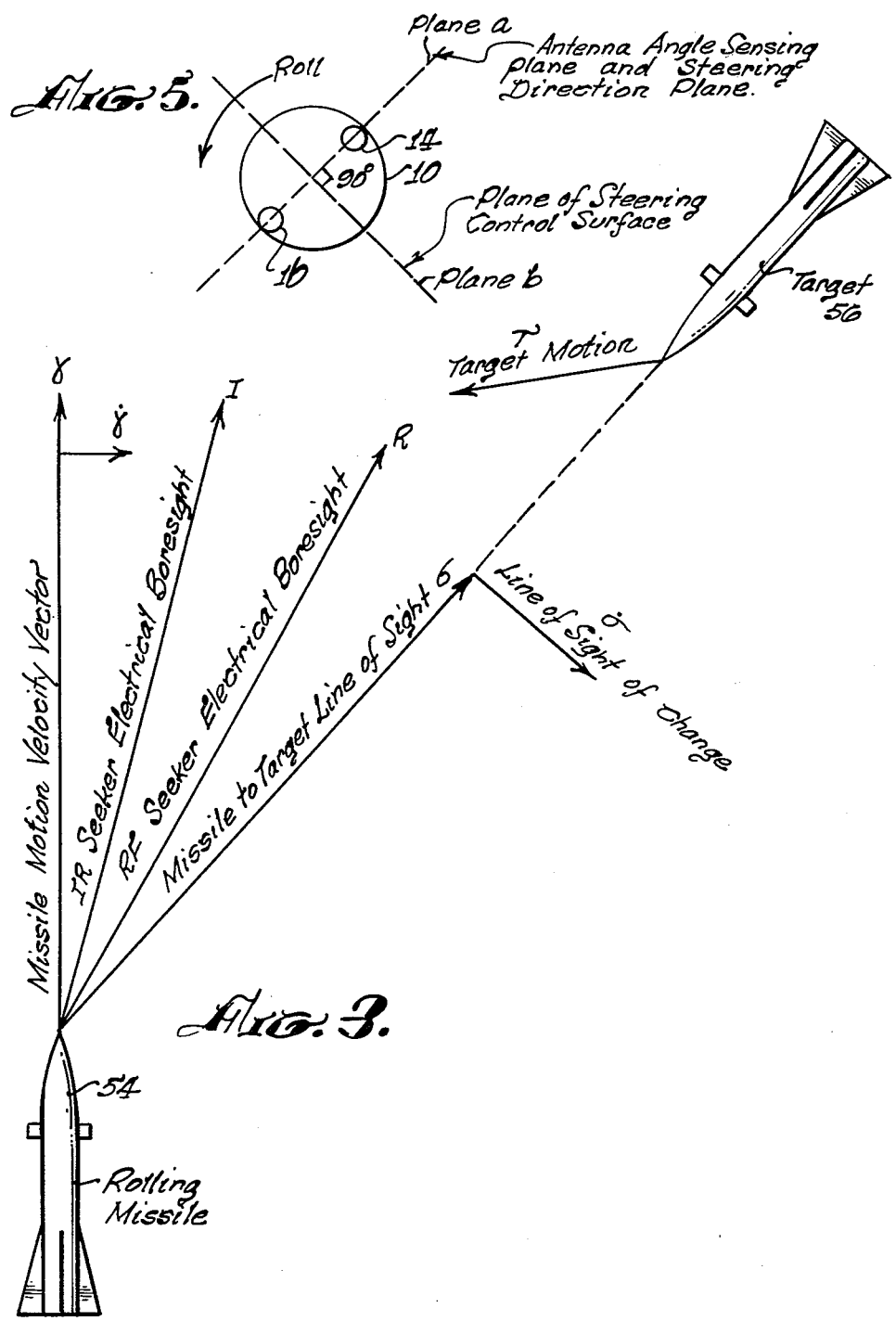

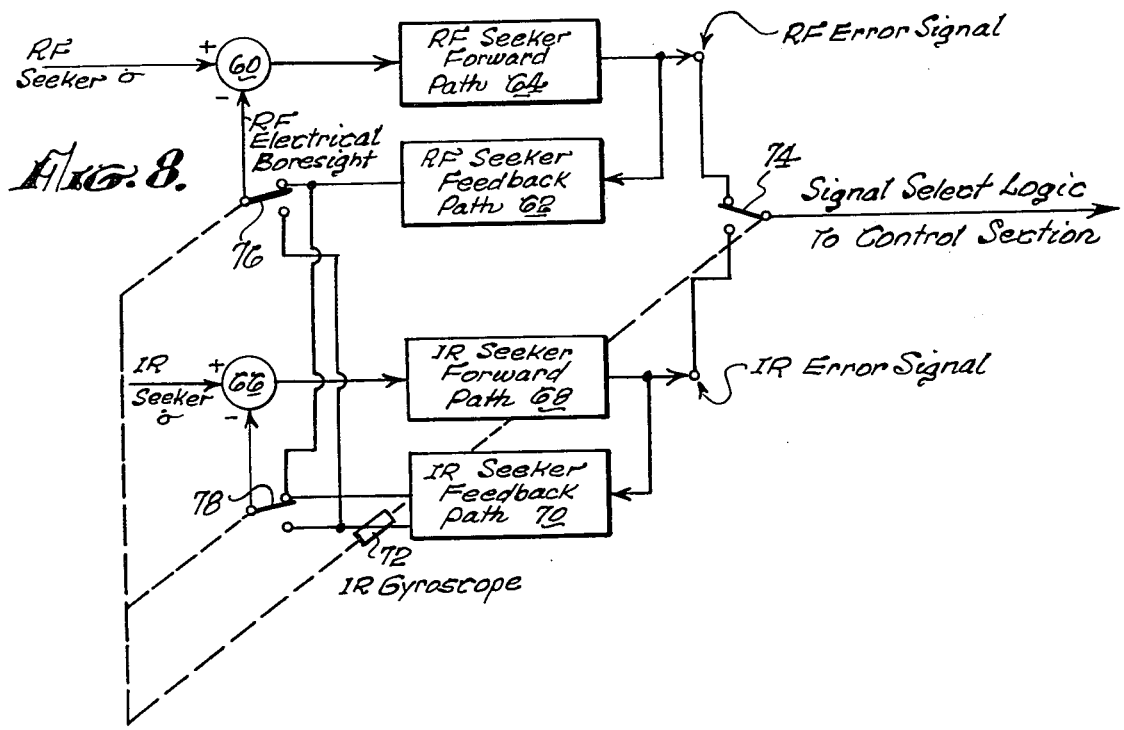
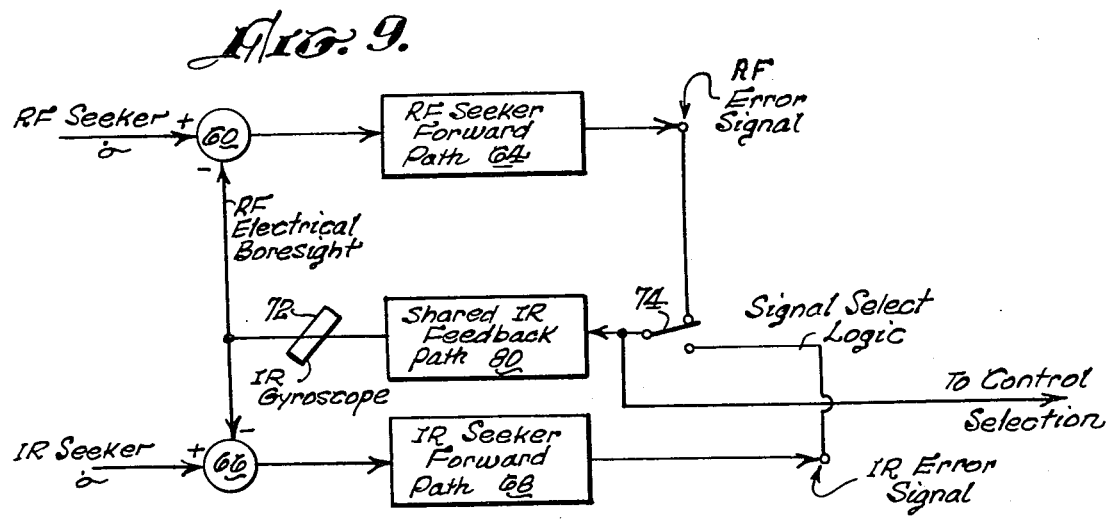

ROLLING DUAL MODE MISSILE

BACKGROUND OF THE INVENTION

Present guided missiles operating upon a single mode or a single spectral range of electromagnetic radiation have various limitations and are susceptible to a variety of relatively effective countermeasures. For example, a seeker passively responsive to radiation such as infrared does not have sufficient range for many necessary applications. On the other hand, a seeker responsive solely to reflected electro-magnetic energy such as radar, while having a long range, does not have sufficient accuracy close-in to a target in many situations. It is therefore, highly desirable to have a seeker system which will overcome the disadvantages of the single mode systems as described above.

SUMMARY OF THE INVENTION

The present invention resolves the problems of the prior art by combining in a rolling missile a passive and an active seeker system. Selection logic is also provided to switch from the active or passive system during flight.

Therefore, it is an object of this invention to provide a dual mode seeker system for a rolling missile.

Another object of this invention is to provide in a rolling missile a dual mode seeker system having selection logic to switch from one mode to the other during flight.

Yet another object of the invention is to provide in a rolling missile a dual mode seeker system having selection logic to select between the two modes during flight while the non-selected mode is continuously being updated with respect to target error information.

BRIEF DESCRIPTION OF THE DRAWINGS

FIG. 1 is a schematic view of the dual mode seeker system in a rolling missile.

FIG. 2 is an elevation view of a dual mode rolling missile in a geometric vector representation with respect to an associated target.

FIG. 3 is an azimuth view of the missile and target of FIG. 2.

FIG. 4 is an end view of the missile and target of FIG. 2.

FIG. 5 is a planar end view of the rolling missile of FIG. 2.

FIG. 8 is a block diagram of the dual mode system having separate feedback paths but with the electrical boresight of the unselected seeker slaved to the electrical boresight of the selected seeker.

FIG. 9 is a block diagram of the dual mode system wherein both modes share a common feedback loop.

DESCRIPTION OF THE PREFERRED EMBODIMENTS

Figure 6:
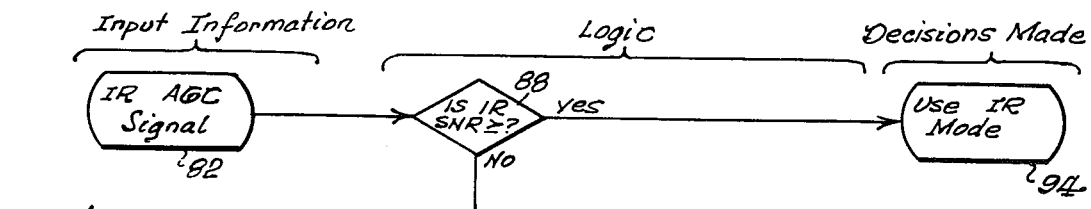
FIG. 6 is a flow chart of switching logic for the dual mode seeker system of FIG. 1.

The seeker for a homing missile plays an important role since it is the means whereby a target is first acquired and then tracked by the missile until intercept. During tracking, the seeker is required to provide information to the missile system for solving the classic proportional navigation equation. The seeker also derives information which may be fed to the missile fuze system to activate detonation at or near intercept.

A homing missile seeker must operate, however, in a multitude of diversified environments. It is faced with a great number of possible countermeasures. Examples of the things it might encounter are non-perfect target signatures, clutter, spill-over, and background, etc. which degrade receiver sensitivity, multiple targets in close formation, and maximum seeing range with a minimum target signature which requires acquisition and tracking at low signal noise ratios.

These environments impose upon the seeker a variety of desirable attributes which are often conflicting. Accordingly, there is not one seeker system which can maintain or even approximate an optimum guidance for all possible operating conditions. While a reflected electromagnetic energy mode can provide usable error signals at long-range, passive infrared modes can provide a more accurate error signal at close range. In addition, different energy seekers behave quite differently as a function of parameters such as missile to target range, the prevailing climatic conditions and the nature of the actual target. In addition, countermeasure techniques seldom cover a large number of bands of the electromagnetic spectrum. The above considerations are equally applicable to a rolling missile, that is, one which is deliberately rolled. The operation and control of rolling missiles is well known in the art and is described in U.S. Pat. Nos. 3,333,790 and 3,351,303.

Referring now to FIG. 1 there is shown a block diagram of a dual mode seeker system for a rolling missile, that is, a seeker which will provide target information for more than one spectral range of radiation. In the particular configuration illustrated, the seeker is shown to receive electromagnetic energy reflected from a target and/or infrared energy emitted from a target. The system basically comprises a substantially cylindrical missile body 10 having mounted at the front thereof a hemispherical dome 12 capable of passing infrared radiation. Two radio frequency (RF) antennas 14 and 16 such as telescoping dielectric polystyrene rods are mounted diametrically opposed at the front of the missile body 10. A spinning magnetic gyroscope arrangement 18 having optical elements (not shown) to receive infrared radiation is mounted behind the dome 12.

The signals from the RF antennas 14 and 16 are fed to microwave mixers 20 and 22 respectively. The mixers 20 and 22 are driven by a local oscillator 24. A phase shifter 26 which receives signals from a demodulator 28 and relative angle sensor 30 is situated between the local oscillator 24 and mixer 20 in a phase shift network. The signals from mixers 20 and 22 are fed to a phase comparator 32 which in turn is coupled through an RF signal processor 23, to a modulator 34. The modulator 34 is coupled to a reference generator 36 which also feeds demodulator 28.

The signal from the IR detector and error sensor 38 mounted rigidly to the spinning magnetic gyroscope 18 is fed to an IR signal processor 39. A three-position signal select logic switch 40 will either pass the IR error signal from the IR detector error sensor 38 or the RF error signal from the modulator 34 to an amplifier 42 which is coupled to both a gyroscope torquing mechanism 44 and a demodulator 46 which also receives signals from the reference generator 36. The output from the demodulator 46 is fed to a servo motor 48 which drives the missile control surfaces 50 and 52. The IR signal processor 39 and RF signal processor 23 are also coupled to an error signal selector 37 which provides for selection of which signal processor, if any, is coupled to the AC amplifier 42, which in turn drives the gyroscope torquing mechanism 44.

In operation, the system shown in FIG. 1 will receive both radio frequency signals reflected from a target and infrared signals originating from the target and depending upon pre-program logic in the error signal selector 37 will select between these signals to produce an error signal to home the missile to the target. The select logic is such that it continuously searches for the best signal and the signal not presently being utilized will be continuously updated in the error signal selector 37 to provide immediate switching capabilities. The error signal selector 37 measures signal amplitudes from the two seekers and compares them with pre-set thresholds to determine whether the related error signal is of sufficient fidelity.

Referring now to FIG. 2, a rolling missile 54 is shown in elevation view with respect to a target 56. The target 56 is moving in a direction indicated by vector T whereas the missile motion velocity vector is identified as $\gamma$. The missile to target line of sight vector $\sigma$ extends between the missile 54 and target 56. The missile to target line of sight rate of change vector $\dot{\sigma}$ and the missile motion velocity rate of change vector $\dot{\gamma}$ are displaced 90° from $\sigma$ and $\gamma$ respectively. The IR seeker electrical boresight and RF seeker electrical boresight are identified as vectors I and R respectively.

An azimuth view of the same missile and target of FIG. 2 is shown in FIG. 3 and has identical symbols and numerals. FIG. 4 represents an end view of this same missile and target with the missile rolling in the direction as indicated by the arrow.

As shown in FIG. 1, the RF antennas 14 and 16 are located at the front of the missile body 10 in a single diametrically opposed plane. This plane is represented in FIG. 5 as Plane a. Assuming that the missile has two control surfaces, these would be located at a 90° angle from the plane of the angle of the antenna a and represented as Plane b in FIG. 5. Again the missile will be rolling in the direction as indicated by the arrow.

Mechanical or electrical tracking is achieved through one or more feedback loops in the dual mode seeker which operates on error signals derived from either the infrared energy or the radio frequency energy. The selected error signals, which will contain information descriptive of the magnitude and direction of the missile to target line of sight rate of change, is then utilized to provide control signals for the control surfaces of the guidance missile thus insuring proportional navigation and an eventual intercept of the target by tracking.

The angle $\epsilon$ between the missile to target line of sight and the missile boresight is continuously measured along the angle sensing Plane a of FIG. 5. Since the missile is rolling, this measured error will vary sinusoidally. The steering direction of the missile will be placed along the error sensing plane of the missile since the steering control surface Plane b of FIG. 5 will roll with the missile and is displaced a 90° angle from the error sensing Plane a. For tracking the target from the infrared mode, the output of the IR seeker and its associated electronics is used. This output contains a sinusoidal voltage whose magnitude is proportional to the missile to target line of sight rate of change $\dot{\sigma}$ and whose phase is proportional to the angle defined by the elevation and azimuth components of the line of sight rate of change. The frequency of the sinusoidal voltage is determined by the spin rate of the spinning magnet 18.

To track the target in the RF mode, the antennas 14 and 16 and their associated electronics are utilized. The antenna output is also a sinusoidal voltage whose magnitude is proportional to the seeker to target line of sight rate of change $\dot{\sigma}$ and whose phase is proportional to the angle defined by the elevation and azimuth components of the line of sight rate of change. The frequency of this sinusoidal voltage is equal to the roll rate of the missile.

The selection of either the IR error signal or the RF error signal to control the missile steering can be performed either during or prior to flight and is based on some optimized or nearly optimized set of rules determined by the particular application for the missile. The decision derived for performing this selection utilizes information such as signal to noise ratios, error signal magnitude, frequency spectral characteristics, etc.

This switching logic is an important aspect of the dual mode seeker. Not only does the dual mode seeker have an IR mode and RF mode but the RF mode may also have two submodes, a skin track mode and a passive (home on jam) mode. The primary objective of the switching mode logic is to select the mode, relative to a preselected threshold level, which will insure the best possible intercept performance for the missile. The selection should consider not only the "clear sky" case but all reasonable types of countermeasures as well.

An example of a basic switching logic scheme is illustrated in the FIG. 6 flow chart and includes input information from the IR mode and both RF submodes. This input information includes an IR AGC signal 82, an RF Skin Track AGC signal 84 and a RF passive (ECM) AGC signal 86. These signals 82, 84 and 86 are fed to respective independent Threshold Decision Elements 88, 90 and 92. As symbolically shown in FIG. 6, Decision Element 88 asks the question, "Is the IR signal-to-noise ratio greater than, or equal to, the threshold (preselected) level?". Similarly, Decision Elements 90, 92 each ask a question, respectively, "Is the RF skin track signal-to-noise ratio greater than, or equal to, the threshold (preselected) level?" and, "Is the RF passive mode signal-to-noise ratio greater than, or equal to, the threshold (preselected) level?". The Decision Elements 88, 90 and 92 are intercoupled to AND Gates 96, 98, and 100 which operate in accordance with the YES/NO decisions received from the Decision Elements. The decision criteria illustrates that the signal-to-noise ratio in a potential mode must exceed a preselected threshold level in order to be a candidate. A weighting is established such that the IR mode will be selected first, then the RF Skin Track mode next, and lastly the RF passive mode. Accordingly, if the IR AGC signal 82 is above the threshold level, Decision Element 88 will make the decision to use the IR mode shown symbolically in Block 94. If the IR AGC signal is below the threshold level, Element 88 will feed this information to AND Gate 96 which will also receive any positive indication from Decision Element 90. With both a "NO" decision from Element 88 and a "YES" decision from Element 90 arriving at AND Gate 96, the Gate operates and the decision is made to use the RF Skin Track mode, as shown in Block 97. If the decisions from Decision Elements 88, 90, are "NO's" and if a "YES decision is rendered by Threshold Decision Element 92, the AND Gate 98 operates and the decision has been made at that time to use the RF passive mode, as represented by Block 102. When Elements 88, 90, and 92 each provide a "NO" decision, their outputs, coupled to AND Gate 100, operate the Gate 100 and the decision has then been made to use the no-guidance mode as symbolically shown in Block 104. If the no-guidance mode is utilized, the missile would not track but, rather, would fly ballistically and, as represented by Keep Searching Block 106, the missile continues to search for a target mode.

There are several basic reasons why the preferences in FIG. 6 have been shown. The IR mode is preferred since it will provide greater guidance accuracy due to the clean signature of the IR target and since it is passive, it is not subject to countermeasures; that is, the target is not given any positive indication of when or what to counter with, other than the exception of flare decoys. It is conceivable that such decoys can be discriminated against by more advanced logic consideration.

The selected signal can then be converted to the frequency corresponding to the missile roll rate if it is not already at that frequency. Following this conversion, the signal is fed to the guidance system which in turn shapes the amplitude of the signal prior to transmission to the control section of the missile. Finally, at the control section the steering command applied to the missile control surfaces is a periodic function whose fundamental component is a sine wave equal in frequency to the missile roll rate. The amplitude of the command signal is proportional to the missile to target line of sight rate of change $\dot{\sigma}$ and the phase of the signal is such that the mean rate of change $\dot{\gamma}$ of the missile velocity vector $\gamma$ is in the same direction as the missile to target line of sight rate of change $\dot{\sigma}$.

Figure 7:
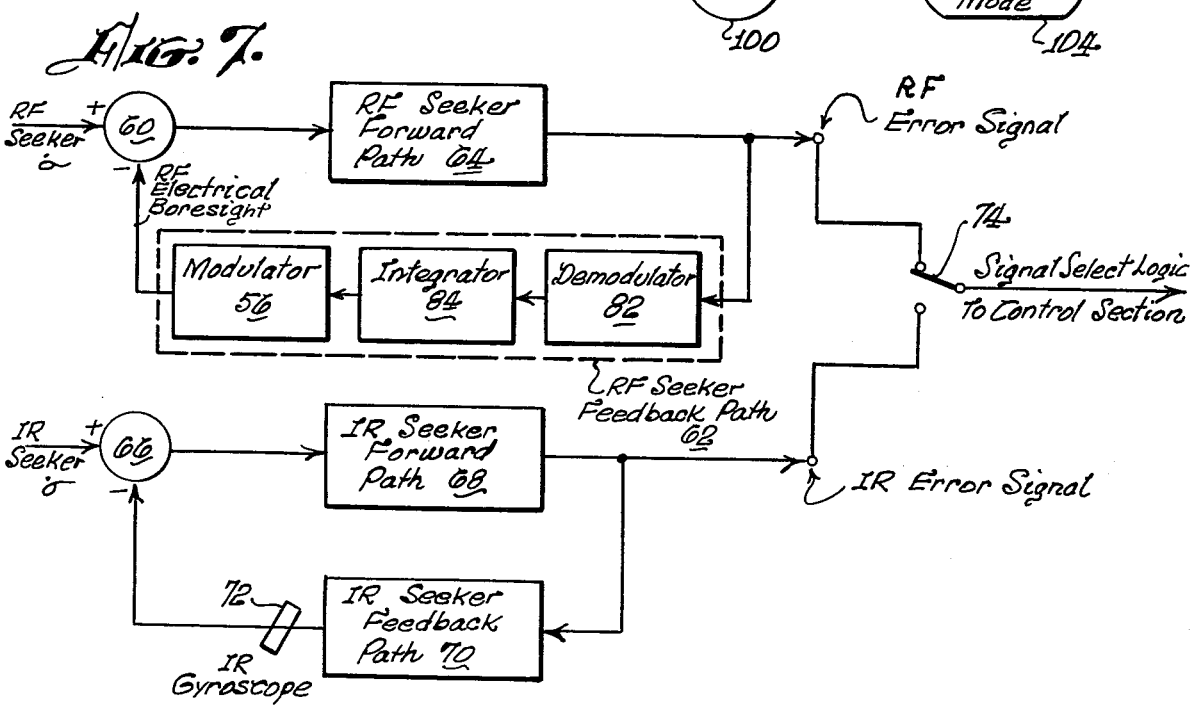
FIG. 7 is a block diagram of the dual mode system wherein each mode has a separate feedback path and independent RF and IR electrical boresights.

There are several possible configurations for interfacing the IR and RF systems. Illustrated in FIG. 7 (which is a simplified functional diagram of certain circuit elements shown in more detail in FIG. 1) is one in which two separate closed loops are utilized, that is, one loop in the RF seeker closed around the RF error signal and one loop in the IR seeker closed around the IR error signal. Both loops are closed simultaneously with the desired error signal, either IR or RF, being selected by the signal select logic. In the RF seeker portion of FIG. 7, $\dot{\sigma}$ is fed to a summer 60 which also receives a signal corresponding to the RF electrical boresight from the RF seeker feedback path 62 around the RF seeker forward path 64. $\dot{\sigma}$ is also fed to summer 66 in the IR portion of the seeker which includes a similar forward path 68 and feedback path 70. In relation to FIG. 1, the summer 60 functionally represents the output of mixer 20 combined with the signal from phase shifter 26. The RF seeker forward path 64 includes the route from the mixer 20 through the phase comparator 32, the RF signal processor 33, and modulator 34 to the RF output portion of the signal select logic switch 40. In FIG. 7, one possible arrangement is illustrated for the RF feedback path 62 which is also shown in FIGS. 8 and 9. The output of the RF seeker forward path 64 is fed to a demodulator 82, then through an integrator 84 and a modulator 86 to the summer 60. These circuits function in a manner well-known to those skilled in the art and a detailed description of their operation is not believed to be necessary. The summer 66 is a functional representation of the optical elements (not shown) which are a part of the spinning magnetic gyroscope arrangement 18. The IR seeker forward path 68 includes the route from the gyroscope 18 through IR detector error sensor 38 and IR signal processor 39 to the IR output portion of the signal select logic switch 40. The IR seeker feedback path includes the route through the amplifier 42 to the gyroscope torquing mechanism 44. The spinning magnetic gyroscope 72 is located between the IR seeker feedback path 70 and summer 66. The RF error signal and IR error signal are both fed to a two position switch 74 which selects between them as to which will continue on to the control section of the missile.

Alternately, one loop corresponding to the selected mode can be closed with the other seeker continuously positioned in an open loop manner by the error signal from the closed loop system as illustrated in FIG. 8. This is accomplished essentially by providing two position switches 76 and 78 in the RF seeker feedback loop and IR seeker feedback loop respectively and connecting these two switches in parallel. As in FIG. 7, the FIG. 8 illustration is a simplified functional diagram of circuit elements shown in more detail in FIG. 1 and discussed herein above.

FIG. 9 illustrates another alternative in which the IR and RF tracking loops share a portion of the basic IR system. As with FIGS. 7 and 8, FIG. 9 is a simplified functional diagram of circuit elements shown in FIG. 1. Specifically the spinning magnetic gyroscope and its associated electronics are shared and thereby provide an integration in the feedback path of the RF seeker tracking loop. A single shared IR feedback path 80 is utilized in conjunction with this configuration. The signal select logic will dictate whether the IR or the RF system supplies the error signal to the feedback path. When utilized by the IR mode, the RF seeker tracking loop will be open and the IR seeker spinning magnetic gyroscope will serve to position the electrical boresight of the RF seeker.

The fundamental outcome of each of the above configurations is that while either mode, IR or RF, is being utilized to derive an error signal, the electrical boresight position of the alternate mode will be continuously updated either by the error signal derived from the selected mode as shown in FIGS. 8 and 9 or by independently tracking the target in its own mode as shown in FIG. 7 though it is not at that time the mode selected for actual missile guidance. In this manner the best error signal for the missile steering command is provided on a continuously updated basis in order to optimize the performance of the missile against the prevailing target or targets. In the latter two methods, the IR and RF electrical boresights are ideally identical; however, normal system imperfections limit this to some non-zero difference. By rolling both the IR seeker and the RF seeker in combination with the missile control surfaces, single plane guidance is achieved periodically through 360° about the rolling axes. This greatly reduces the quantity and complexity of the hardware involved in the guidance and control of the roll missile. These simplifications primarily result from the fact that only one guidance channel is required from the antenna to the control surfaces.

Among the other advantages provided by this dual mode concept utilizing RF/IR target tracking seekers in a rolling airframe are: all weather guidance capability with precision terminal accuracy; elimination of the classic multiple target problem; increased electronic countermeasure resistance; no IR/RF dome compatability problem; exploitation of the low cost, high performance capability of the rolling missile single guidance/-control channel system; high missile reliability and low missile cost due to reduced usage of mechanical moving parts; and low guidance section cost due to multi-function usage of presently existing hardware components.

The dual mode rolling airframe concept is not restricted to tactical missile applications where interception of a target is desired but can be applied to any aircraft, missile, rocket or space craft irrespective of the atmosphere in which it travels provided that the craft is rolling and can utilize two or more types of electromagnetic energy for guidance. Having defined the system parameters for a rolling missile for two modes of guidance, similar techniques can be utilized for tying together a multi-mode system using three or more seekers on a common rolling airframe.

It should be understood that while specific embodiments of the invention have been illustrated and described there are many modifications which can be made thereto without departing from the spirit and scope of the invention. Accordingly these embodiments are provided solely by way of example and the invention should not be limited thereby, but is defined by the proper scope of the appended claims.

What is claimed is:

1. A rolling vehicle seeker system comprising:
   (a) first receptor means mounted upon the rolling vehicle to receive energy in a first spectral range of radiation from a prospective target and produce a first output signal;
   (b) second receptor means mounted upon the rolling vehicle to receive energy in a second spectral range of radiation from the same prospective target and produce a second output signal; and
   (c) signal processing means operably associated with said first and said second receptor means to receive said first and said second output signals therefrom to produce a first error signal from said first output signal and a second error signal from said second output signal and including means to continuously select between said first error signal and said second error signal according to a preselected logic.

2. The rolling vehicle seeker system of claim 1 wherein said signal processing means additionally includes means to continuously update the error signal not selected by the error signal selection means.

3. The rolling vehicle seeker system of claim 2 wherein said error signal updating means utilizes the selected error signal to update the non-selected error signal.

4. The rolling vehicle seeker system of claim 2 wherein said non-selected error signal updating means includes at least one feedback path.

5. The rolling vehicle seeker system of claim 2 wherein said error signal updating means includes a feedback path shared by the selected and non-selected error signals.

6. The rolling vehicle seeker system of claim 1 wherein:
   (a) said first receptor means is active to receive radiation reflected from a prospective target and
   (b) said second receptor means is passive to receive radiation emanating from the same prospective target.

7. The rolling vehicle seeker system of claim 6 wherein:
   (a) said active first receptor means comprises at least two antennas to receive reflected electromagnetic radiation; and
   (b) said passive second receptor means comprises seeker means to receive infrared radiation emanating from the prospective target.

8. The rolling vehicle seeker system of claim 1 wherein said first receptor means includes:
   (a) a first antenna operably mounted upon the rolling vehicle to receive said energy in said first spectral range of radiation from the prospective target; and
   (b) a second antenna operably mounted upon the rolling vehicle to also receive said energy in said first spectral range of radiation from the prospective target; and wherein said signal processing means includes:
   (c) first microwave mixer means operably connected to said first antenna to receive said first output signal;
   (d) second microwave mixer means operably connected to said second antenna to also receive said first output signal;
   (e) phase shift network means including a phase shifter operably connected to said first microwave mixer means to shift the phase of said first output signal in said first microwave mixer means;
   (f) an oscillator operably connected to said phase shifter and to said second microwave mixer means;
   (g) a phase comparator operably connected to said first and second microwave mixer means and responsive thereto;
   (h) an RF signal processor of said error signal selection means operably coupled to said phase comparator and responsive thereto;
   (i) a modulator operably connected to said RF signal processor and responsive thereto, said modulator additionally being operably coupled to said error signal selection means and to said phase shift network means; and
   (j) circuit means operably connected to said error signal selection means and to said phase shift network means for receiving and processing said selected error signals to control the rolling vehicle.

9. The rolling vehicle seeker system of claim 1 wherein said error signal selection means includes:
   (a) a switch;
   (b) error signal selector means operably coupled to said switch to control said switch;
   (c) first signal processor means operably connected to said error signal selector means for providing said first error signal to said error signal selector means; and
   (d) second signal processor means operably connected to said error signal selector means for providing said second error signal to said error signal selector means.

10. The rolling vehicle seeker system of claim 8 wherein said circuit means comprises:
    (a) an amplifier operably connected to said error signal selection means and responsive thereto; and
    (b) a demodulator operably connected to said amplifier and responsive thereto.

* * * * *